US005631651A

United States Patent [19]
Nichols et al.

[11] Patent Number: 5,631,651
[45] Date of Patent: *May 20, 1997

[54] TELECOM ADAPTER FOR INTERFACING COMPUTING DEVICES TO THE ANALOG TELEPHONE NETWORK

[75] Inventors: James B. Nichols, San Mateo; John Lynch; Mark Devon, both of San Jose, all of Calif.

[73] Assignee: Apple Computer, Inc., Cupertino, Calif.

[*] Notice: The term of this patent shall not extend beyond the expiration date of Pat. No. 5,495,246.

[21] Appl. No.: 477,548

[22] Filed: Jun. 7, 1995

Related U.S. Application Data

[63] Continuation of Ser. No. 78,890, May 10, 1993, Pat. No. 5,495,246.
[51] Int. Cl.[6] .................................................. H03M 1/12
[52] U.S. Cl. .................................................. 341/155
[58] Field of Search ........................... 341/155; 379/93, 379/94, 95, 96

[56] References Cited

U.S. PATENT DOCUMENTS 5,495,246  2/1996  Nichols et al. ........................ 341/155

*Primary Examiner*—Brian K. Young
*Attorney, Agent, or Firm*—Burns, Doane, Swecker & Mathis, L.L.P.

[57] ABSTRACT

A telecommunications adapter interfaces computing devices to the analog telephone network, achieving a tightly integrated digital telecommunications link with the analog telephone network. The telecommunications adapter takes advantage of certain host resources including, preferably, the computer's signal processor, the computer's power supply and a computer/peripheral serial interface. System cost for digital communications over the analog network is therefore reduced. Furthermore, the telecommunications adapter is able to accept and deliver a digitized representation of the analog (voice) data stream in real time, supporting both existing and future voice-band communications technologies. Finally, the invention facilitates rapid and inexpensive adaptation to the various international telephone standards. Instead of replacing an entire modem, a relatively inexpensive satellite processor (i.e., the telecom adapter) may be replaced instead. Data stream synchronization is achieved between the digital data stream and a time-driven DSP task list within the computer. Wide-area communications data streams—either data or voice—obtained from analog telephone lines may therefore be conveniently manipulated and blended into the computer's sound facilities, for example.

16 Claims, 5 Drawing Sheets

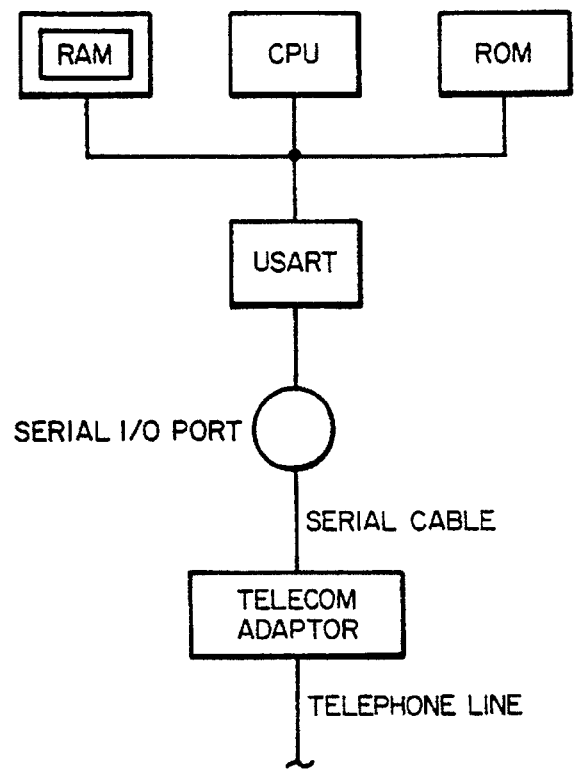
FIG_1
*(PRIOR ART)*
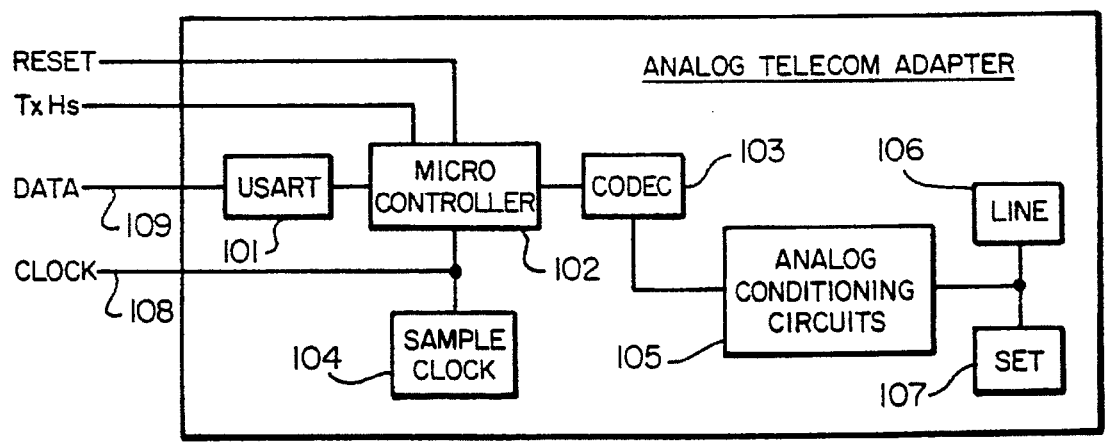
FIG_2

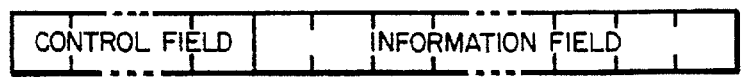
FIG_3
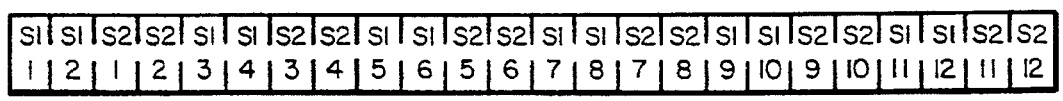
FIG_4
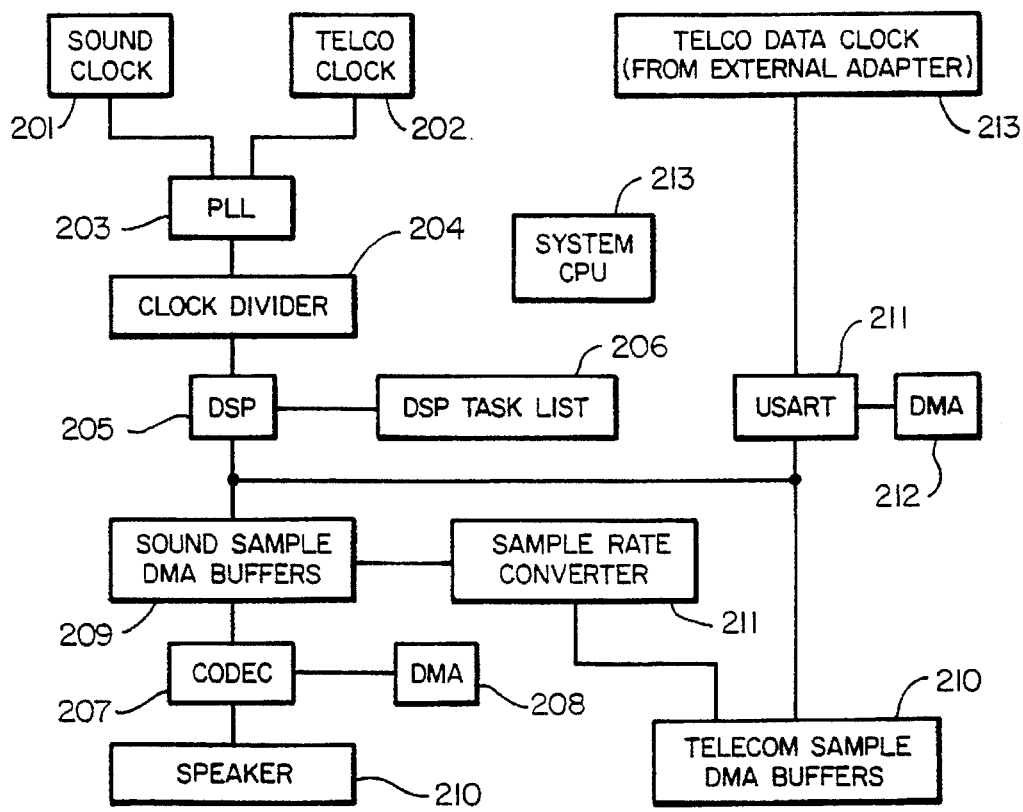
FIG_5

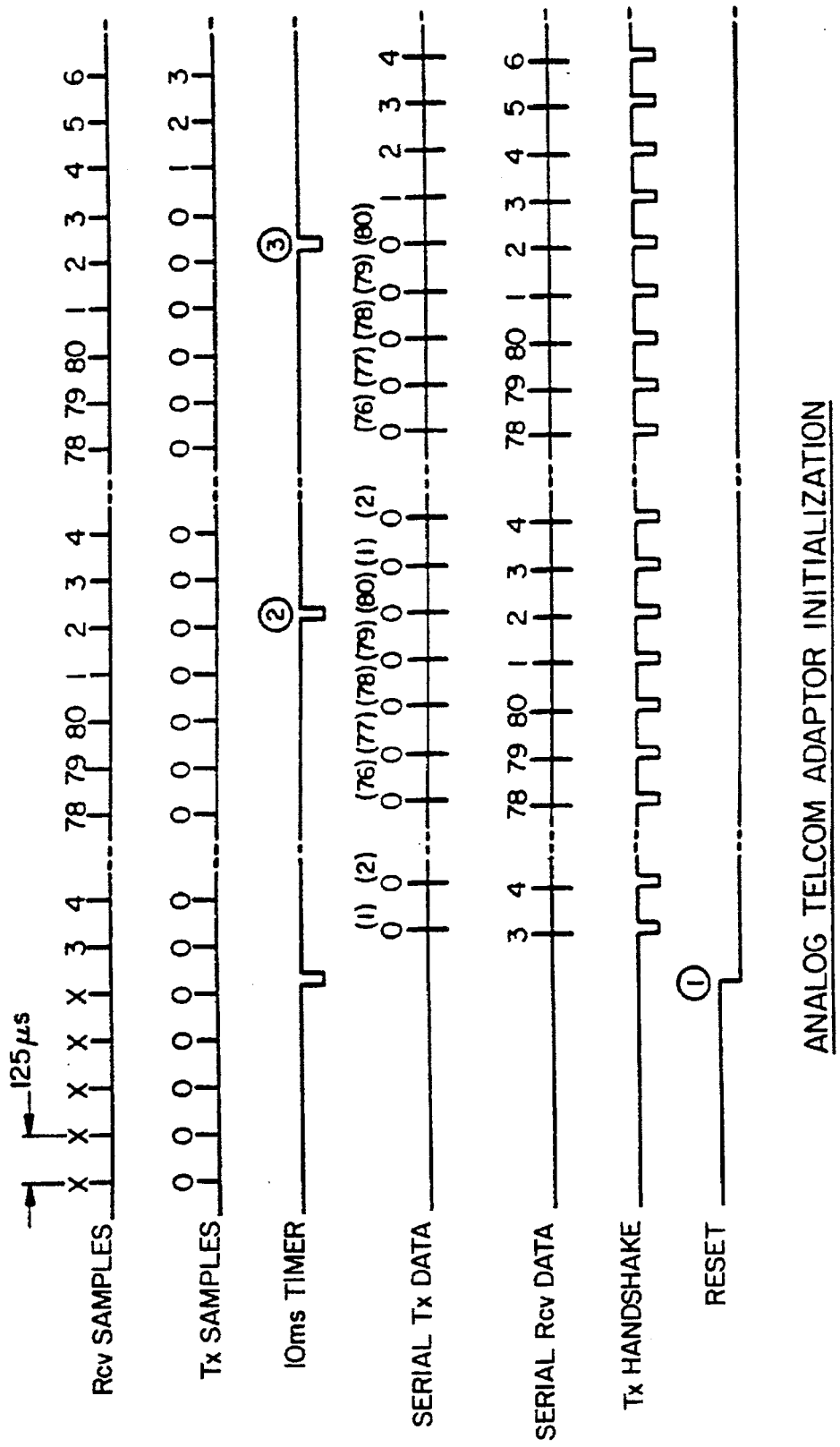
FIG_6
ANALOG TELCOM ADAPTOR INITIALIZATION

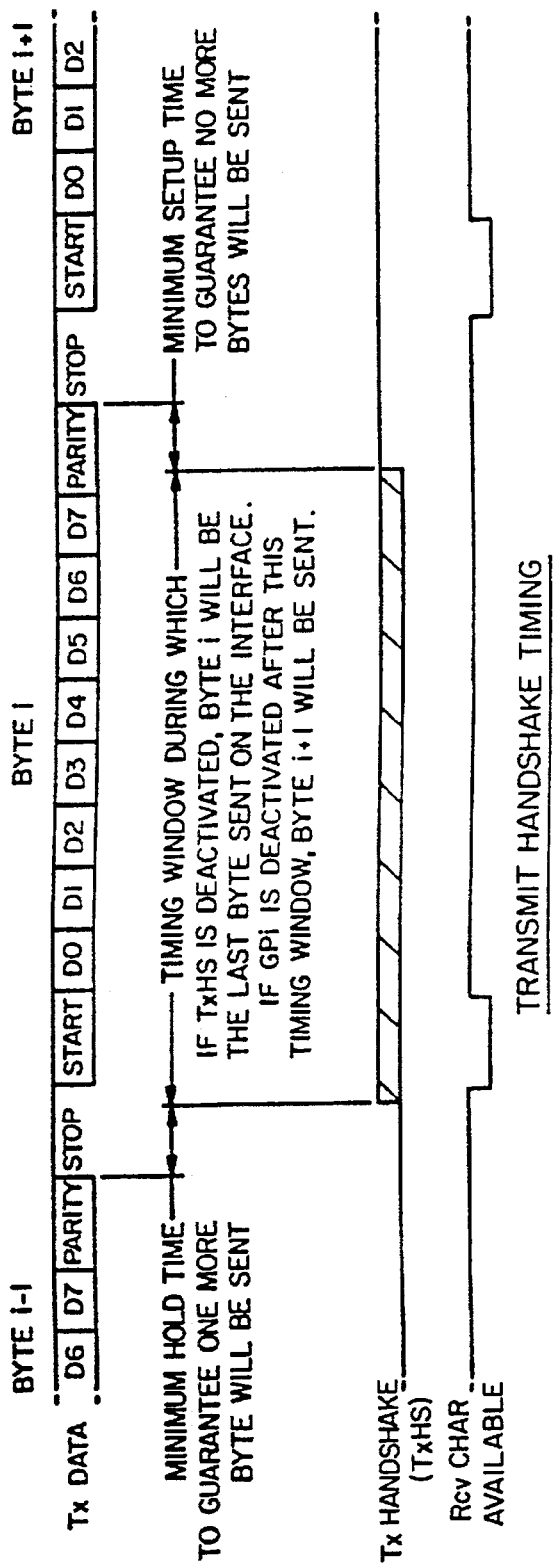
TRANSMIT HANDSHAKE TIMING
FIG_7
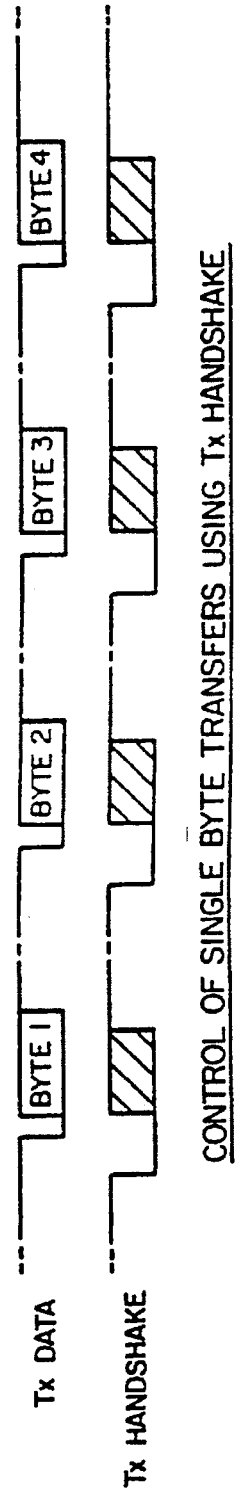
CONTROL OF SINGLE BYTE TRANSFERS USING Tx HANDSHAKE
FIG_8

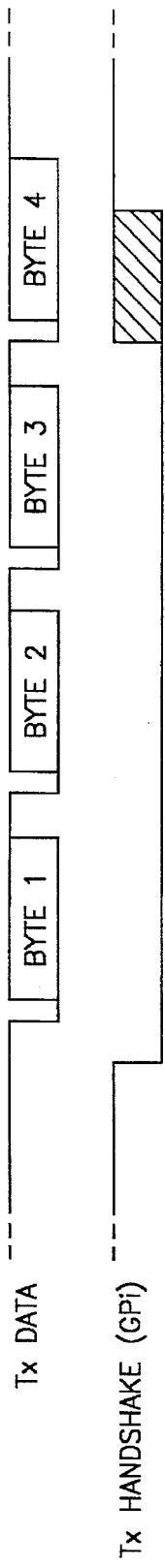
FIG_9A
CONTROL OF BLOCK TRANSFER USING Tx HANDSHAKE (GPi)
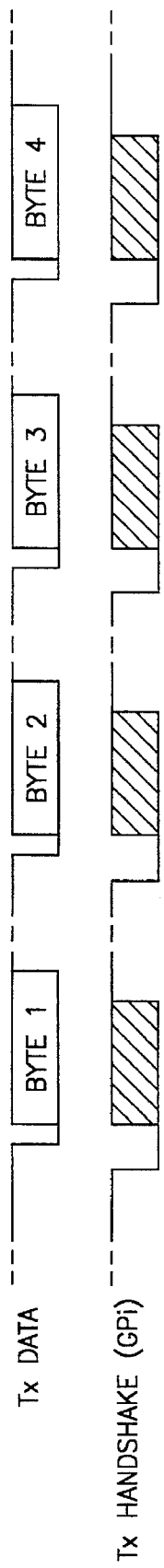
FIG_9B
CONTROL OF SINGLE BYTE TRANSFERS USING Tx HANDSHAKE (GPi)

TELECOM ADAPTER FOR INTERFACING COMPUTING DEVICES TO THE ANALOG TELEPHONE NETWORK

This application is a continuation, of application Ser. No. 08/078,890, filed May 10, 1993 now U.S. Pat. No. 5,495,246.

BACKGROUND OF THE INVENTION

1. Field of the Invention

The present invention relates to data telecommunications and more particularly to data telecommunications over the wide-area analog telephone network.

2. State of the Art

The analog telephone network by its nature uses analog electrical signalling over copper wire between a central office and customer telephone sets. Computer communications, being based on digital signalling, require an analog to digital conversion to be performed in order to support digital communications over the analog phone network. This conversion is typically done by a modem (modulator/demodulator). This approach is adequate for basic digital data communications, and has been employed for the last several decades. A typical modem consists of a digital signal processor (DSP), a hybrid 2/4 wire interface, a codec, a microcontroller to manage system functions, and a serial interface to the computer, typically using the RS232C signalling approach with ASCII encoding.

There are significant disadvantages to this approach. By embedding the entire communications and signal processing functionality in an external device, a lower bound is placed on the cost of the device. Furthermore, the RS232C/ASCII signalling convention precludes access to non-digital (analog) signals that may be carried on the telephone network. Direct access to a digital representation of the analog channel is required for voice recognition, text-to-speech conversion, proprietary encoding of video signals, and other related technologies. Finally, conventional modems do not allow for adaptation to the various international telephone standards, requiring instead replacement of the entire modem.

SUMMARY OF THE INVENTION

The present invention, generally speaking, provides a telecommunications adapter for interfacing computing devices to the analog telephone network that overcomes the foregoing disadvantages and achieves a tightly integrated digital telecommunications link with the analog telephone network. The telecommunications adapter takes advantage of certain host resources including, preferably, the computer's signal processor, the computer's power supply and a computer/peripheral serial interface. System cost for digital communications over the analog network is therefore reduced. Furthermore, the telecommunications adapter is able to accept and deliver a digitized representation of the analog (voice) data stream in real time, supporting both existing and future voice-band communications technologies. Finally, the invention facilitates rapid and inexpensive adaptation to the various international telephone standards. Instead of replacing an entire modem, a relatively inexpensive satellite processor (i.e., the telecom adapter) may be replaced instead.

In particular, in accordance with one embodiment of the present invention, a telecommunication adapter for inputting to a computer workstation a digital data stream representing a real time continuous analog signal includes circuitry for receiving an analog signal and converting the analog signal to a voice-rate or greater digital data stream and interface circuitry for receiving the digital data stream and inputting the digital data stream to the computer workstation through a communications port of the computer workstation. In accordance with another aspect of the present invention, data stream synchronization is achieved between the digital data stream and a time-driven DSP task list within the computer. Wide-area communications data streams—either data or voice—obtained from analog telephone lines may therefore be conveniently manipulated and blended into the computer's sound facilities, for example.

BRIEF DESCRIPTION OF THE DRAWINGS

The present invention may be further understood from the following description in conjunction with the appended drawings. In the drawings:

FIG. 1 is a simplified block diagram of a computer system in which the present invention may be used;

FIG. 2 is a block diagram of a telecom adapter in accordance with the present invention;

FIG. 3 is a diagram of a typical time-division-multiplex data stream;

FIG. 4 is a diagram of a possible information field data frame of the data stream of FIG. 3;

FIG. 5 is a block diagram of a data stream synchronization arrangement; and

FIGS. 6–8 illustrate a procedure used to guarantee rime-reference synchronization between the computer system and the telecom adapter.

DETAILED DESCRIPTION OF THE PREFERRED EMBODIMENTS

The computer system of FIG. 1 is exemplary of a wide variety of computer systems, both large and small, in which serially-connected communications devices may be found and with which the present telecom adapter may be used. An address bus and a data bus connect a central processing unit (CPU) to read-only memory (ROM), and, through bus transceivers, to random-access memory (RAM) and to a UART (universal asynchronous receiver transmitter) or a USART (universal synchronous/asynchronous receiver transmitter) that provides an interface to a serial I/O port(s). A telecom adapter is shown connected to the serial port.

The present telecom adapter provides a versatile, general-purpose interface to the wide-area communications analog telephone network. Referring to FIG. 2, the telecom adapter contains analog to digital conversion facilities (103), electrical and mechanical interface hardware (105), clock generation and/or recovery circuits (104), serial-to-parallel translation hardware (101) to exchange the digital data between the telecom adapter and host computer; and a state machine (microcontroller 102) which manages the synchronization and delivery of digital samples to the host via a time-division-multiplexed data stream. The analog data streams are derived from signals from the telephone channel (106) and a standard telephone desk set (107).

A serial interface protocol and procedure is defined for attaching the telecom adapter through a short cable to a standard communications port, for example the serial port, of a computer workstation. The computer workstation is assumed to be equipped with direct memory access (DMA) whereby DMA may be used to service the serial port and off-load the computer's central processing unit (CPU), allowing continuous real time communications to be maintained. A related protocol and procedure, described in U.S. application Ser. No. 08/058,750, incorporated herein by reference, enables non-DMA capable computers to establish through the serial port a high-speed communications link to digital networks including the Integrated Services Digital Network (ISDN) and Private Branch Exchange (PBX) networks, using a more advanced telecom adapter.

Referring still to FIG. 2, the external telephone network connects to the telecom adapter at jack (106). This signal is then conditioned by a suitable electrical interface to provide proper signal amplification and filtering before submission to the codec (digitizer) interface (103). The codec is clocked by an internally generated oscillator (104). This oscillator is also used to derive the telecom sample clock (108) that is delivered to and employed by the host for datastream synchronization as explained hereinafter. Digitized samples are clocked between host and telecom adapter bit-synchronously and in phase with sample generation in the telecom adapter. Thus no buffering of digital data within the telecom adapter is required.

Using full-duplex DMA hardware in the computer, a time-division-multiplied (TDM) interface may be supported. A transmit handshake line (110) is provided on the serial interface as shown in FIG. 2. When the telecom adapter wishes to exchange a set of data from a continuous bit rate (CBR) real time data stream with the computer, it simply transmits any bytes to be transmitted to the computer and then uses the transmit handshake line (110) to force the computer to transmit the appropriate number of bytes to the telecom adapter. In this way, the constant bit rate stream can be maintained without any intervention by the computer's CPU. Because the telecom adapter is directly servicing the source of the stream, namely the communications line, the telecom adapter is better able than the computer to maintain the timing of the constant bit rate stream.

Control of the telecom adapter through the TDM interface is performed by a software telecom adapter handler routine in the computer. Typically, TDM data streams are broken up into fixed length frames consisting of a control field and a data field as shown in FIG. 3. The control field carries adapter dependent information, and the information field carries the data. These frames are repeated at a fixed period of time, called the frame period. The control field is used by the software handler to set up data buffers for these frames. The specifics of the control field depend on the specific hardware implementation of the telecom adapter.

The information field of the TDM frame consists of an integral number of interleaved sets of data for, in the case of the analog telephone network, each of two data streams. The number bytes in each set for a stream is called the stream's interleave factor (IF). A possible frame for the telecom adapter of FIG. 2 is shown in FIG. 4 in which two streams are interleaved, each with an interleave factor of two.

Each stream in the information field is characterized by three parameters: the interleave factor, or the number of bytes in each occurrence of the stream, the offset, or the number of bytes into the information field that the first byte of the stream occurs, and the repeat factor—the offset between the first byte of one occurrence of the stream and the first byte of the next occurrence of the stream. For example, in FIG. 4, Sream 2's interleave factor is two, its offset is one, and its repeat factor is two.

Providing for the exchange of digital real time data streams between various components of the host system and the telephone network enables interworking of the host computer within a larger, possibly global, network of computers. Typical computer subsystems would include, but are not limited to, sound generation, audio recording, video, and so on. In all cases, the host subsystem data stream that exchanges data with the telecom adapter must be phase-synchronized with the telecom data stream.

A procedure for initialization and operation of the telecom adapter by the host computer, to be described presently in relation to FIG. 5, allows wide-area communications data streams obtained from analog telephone lines to be conveniently manipulated and blended into the computer sound facilities, for example. The host computer contains signal processing resources useful for generation and detection of voice-band data signals (modem), speech generation, voice recognition, sound synthesis, and the like. The procedure ensure that a precise integer relationship is maintained between telecom data and the particular subsystem of interest, such that the host interface subsystem data stream is time-aligned with the telecom adapter data stream.

Referring to FIG. 5, the host computer system typically employs a CISC (complex instruction set) microprocessor as the central processor (213). However, contemporary CISC processors by their nature lack sufficient processing capacity to treat the digital telecom adapter datastream in real-time. For example, a V.32 analog modem signal could not be generated and delivered to the telecom adapter by the CISC CPU. Therefore, a Digital Signal Processor (DSP) (205) is employed as a coprocessor to perform the laborious but requisite signal transformation computations on the telecom data stream.

The DSP is a general purpose resource at the disposal of potentially several host computer clients. The host computer operating system software therefore employs a time-based software scheduling algorithm to ensure its clients of reasonable access to the DSP processing resources. The time-based scheduling concept is based on a list of tasks (206) that are defined by the host processor, and executed in a sequential manner on the DSP. The time-base atomic unit is called a frame. For this reason the time-based scheduling system is also called a frame-based signal processing system.

Operation of the telecom adapter is as follows. The bit-synchronous clock (108) and bidirectional datastreams are delivered to the host computer on the serial interface (213). The serial data is clocked into a serial-to-parallel converter (211) according to the transitions of the bit-synchronous clock. Since the datastream is realtime, continuous, and must be delivered reliably, regardless of tasks that may be running on the central processor (213), a dedicated Direct Memory Access (DMA) channel (212) is used. The DMA circuit moves data between the Telecom Sample Buffers (210) and the telecom adapter.

At the same time, the DSP (205) may be executing a parallel time-based task such as sound synthesis over the system speakers. In this case the speaker (210) is driven by a codec (207) from the sound sample buffers (209) which are filled as a result of computations made by the DSP. Again, since the datastream is realtime synchronous, a DMA channel is dedicated to the sound system to ensure reliable transfer of the sound samples to the speaker.

In order to provide the reliable exchange of sample data between the host computer sound system and the telecom adapter, the sound sample buffer must maintain a fixed phase and time relationship with the telecom sample buffer. Note that, at the same time, the DSP operates according to a time-based scheduling algorithm. Therefore the following procedure is implemented. First, the telecom clock, which was previously shown to be bit-synchronous and in phase with the datastream delivered by the telecom adapter, is delivered to the host computer USART (211) and a Phase-Locked Loop (203). The telecom data clock is used to synchronize the sound clock (201) which nominally operates at an integer multiple of the telecom data clock. Thus the sound clock is phase-aligned with the telecom data clock.

The output of the PLL is then passed to a clock divider (204) which reduces the clock frequency to yield a periodic pulse. This periodic pulse defines the DSP time frame and is used to awaken the DSP and cause it to execute the task list. The tasks are executed repetitively according to the periodic pulse, which has a nominal period of ten milliseconds. Included in the task list are the sound generation task(s), the telecom sample processing task(s), and a sample rate conversion task. The purpose of the sample rate converter (211) is to transform the N samples found in the telecom sample buffer into M samples loaded into the sound sample buffer by the DSP. However, there must be a strict time alignment between the sound buffer and the telecom sample buffer. Therefore, the telecom adapter is initialized in precise reference to the output of the clock divider (204).

The telecom adapter has a reset line (111) which is driven by the host computer. The reset line holds the telecom data and clock lines in a quiescent state, when asserted. The clock line is activated, and sampling commences, when the reset line is de-asserted. A procedure illustrated in FIGS. 6–8 is executed by the System CPU (213) whereby the output of the clock divider is monitored, such that the telecom adapter reset input is asserted and released at the appropriate time to guarantee time-reference synchronization.

More particularly with reference to FIG. 7, prior to time 1, the system CPU has already set up the DMA controller to start receiving data into the third sample of the receive buffer where the DSP will expect to get the samples at the end of the 10 ms period. The system CPU has set up the DMA controller to start transmitting data from the transmit buffer which has been initialized with two frames worth of null samples. When the system CPU sees the 10 ms timer fire at time 1, it will activate the reset (DTR) signal, bringing the telecom adapter out of the beacon phase and into operation. The telecom adapter will then grab the next receive sample from the codec and transmit it to the host, where DMA will place it into the receive buffer. The telecom adapter will then activate the Tx Handshake line long enough to receive one sample from the host, which will be fed to the codec at the next sampling period. The telecom adapter will continue to exchange samples with the host in this way until the reset (DTR) signal is inactivated. Each sample exchange consists of the telecom adaptor sending four receive bytes to the host and the telecom adapter retrieving four transmit bytes from the host, consisting of one sample for each of two channels and two bytes per sample.

When the DSP receives a 10 ms interrupt at time 2, there will be 80 receive samples in the receive buffer. The DSP will block move these samples into its own memory. The DSP must skip every other sample in the buffer since both channel's samples are in the buffer. Once the DSP has all the receive samples it will process these and produce transmit samples within 10 ms.

When the next 10 ms time goes off at time 3, the DSP will have placed the transmit samples in the transmit buffer beginning with the first location after the initial 160 null samples. The next time the telecom adapter and host exchange samples the real transmit sample will begin being sent. The maximum delay between a receive sample and its corresponding transmit sample will be two frame periods plus four sample periods, in this case 20 ms+(4* 125 μs)=20.5 ms.

After the initialization sequence is executed, data is delivered from the telecom adapter to the host computer with both phase and time alignment. Therefore the DSP, which is time scheduled for frame-based processing, is assured that the N telecom samples, which arrive from the telecom adapter via the system DMA hardware, are entirely coincident with the generation of the M sound samples contained in the sound sample DMA buffer.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of the invention as defined by the following claims.

What is claimed is:

1. An adapter for inputting to a computer a digital data stream representing a real time continuous analog signal, comprising:

means for receiving an analog signal and converting the analog signal to a voice-rate or greater digital data stream, comprising:

a telephone line connector;

an analog conditioning circuit connected to the telephone line connector; and a codec connected to the analog conditioning circuit; and interface means for receiving the digital data stream and inputting the digital data stream to the computer workstation through a communications port of the computer workstation;

wherein the interface means comprises:

a UART;

a microcontroller connected to the UART; and a sample clock connected to the microcontroller.

2. The apparatus of claim 1, wherein the means for receiving and convening further comprises:

a microcontroller connected to the codec; and a sample clock connected to the microcontroller.

3. The apparatus of claim 2, further comprising a handset connector connected to the analog conditioning circuit.

4. The apparatus of claim 3, wherein the interface means frames the digital data stream so as to provide for a plurality of logical data streams.

5. The apparatus of claim 3, wherein the serial cable further includes a reset line and a transmit handshake line, both connected to the microcontroller.

6. The apparatus of claim 5, wherein the microcontroller pulses the transmit handshake line to request data from the computer workstation on a byte-by-byte basis.

7. The apparatus of claim 5, wherein the microcontroller is responsive to deactivation of the reset line to transmit a series of bytes to the computer workstation and, in one-to-one correspondence thereto, to receive a series of bytes from the computer workstation.

8. A computing apparatus for receiving data samples representing a real time analog signal and for processing the data samples, comprising:

a serial communications port including a UART;

means for storing the data samples;

means for directly transferring the data samples from the communications port to the means for storing;

means responsive to a clock signal from the telecom adapter for deriving a lower-frequency clock signal; and digital signal processing means responsive to each occurrence of the lower-frequency clock signal to retrieve a predetermined number of data samples from the means for storing and for processing the predetermined number of data samples to produce processed data samples.

9. The apparatus of claim 8, wherein the means responsive to a clock signal from the telecom adapter for deriving a lower-frequency clock signal includes a local clock and a phase locked loop.

10. The apparatus of claim 9, further comprising means for storing the processed data samples.

11. The apparatus of claim 10, wherein the local clock is a sound clock, and the means for storing the processed data samples is a sound sample buffer.

12. The apparatus of claim 11, further comprising a codec connected to the sound sample buffer.

13. The apparatus of claim 12, further comprising a speaker connected to the codec and means for directly transferring the sound samples from the sound sample buffer to the codec.

14. The apparatus of claim 3, wherein the interface means further comprises a serial cable connected between the UART and the communications port of the computer workstation.

15. The apparatus of claim 14, wherein the seral cable includes a plurality of data lines connected to the UART and a clock line connected to the sample clock.

16. The apparatus of claim 3, wherein the interface means frames the digital data stream using time division multiplex framing so as to provide for a plurality of logical data streams.

* * * * *